United States Patent
Tamura (10) Patent No.: US 8,068,418 B2
(45) Date of Patent: Nov. 29, 2011

(54) INFORMATION PROCESSING APPARATUS (75) Inventor: Toshiya Tamura, Kokubunji (JP)

(73) Assignee: Fujitsu Toshiba Mobile Communications Limited, Kawasaki (JP)

(*) Notice: Subject to any disclaimer, the term of this patent is extended or adjusted under 35 U.S.C. 154(b) by 919 days.

(21) Appl. No.: 12/075,724

(22) Filed: Mar. 13, 2008

(65) Prior Publication Data
US 2008/0268903 A1 Oct. 30, 2008

(30) Foreign Application Priority Data

Apr. 27, 2007 (JP) .............................. P2007-118804

(51) Int. Cl.
G01R 31/08 (2006.01)
(52) U.S. Cl. .................. 370/230; 370/252; 455/410
(58) Field of Classification Search .................. 370/313, 370/230, 252; 455/410
See application file for complete search history.

(56) References Cited

U.S. PATENT DOCUMENTS

| 2004/0117657 A1* | 6/2004 | Gabor et al. .................. 713/201 |
| 2005/0079825 A1* | 4/2005 | Omori et al. ............... 455/67.11 |
| 2008/0005241 A1* | 1/2008 | Cohen et al. .................. 709/204 |

* cited by examiner

Primary Examiner — Kevin C Harper
Assistant Examiner — Sai-Ming Chan
(74) Attorney, Agent, or Firm — Maschoff Gilmore & Israelsen (57) ABSTRACT According to an aspect of the invention, there is provided an information processing apparatus including a dividing unit configured to divide coded audio data in unit of frame when the audio data is transmitted to an external device; a generating unit configured to generate packets to be transmitted to the external device based on the divided coded audio data; a transmitting unit configured to store the generated packets and transmit the stored packets to the external device; an acquiring unit configured to acquire, from the external device, parameter information supported by the external device; a determining unit configured to determine, by comparing acquired parameter information and designated parameter information, whether the transmission of the coded audio data is acceptable, and determine whether the parameter information designated by the external device includes protection information.

12 Claims, 6 Drawing Sheets

INFORMATION PROCESSING APPARATUS

CROSS-REFERENCE TO RELATED APPLICATIONS

This application is based on and claims the benefit of priority from the prior Japanese Patent Application No. 2007-118804, filed on Apr. 27, 2007; the entire contents of which are incorporated herein by reference.

TECHNICAL FIELD

The present invention relates to an information processing apparatus, and more particularly, to an information processing apparatus capable of transmitting real-time audio data in a streaming manner.

BACKGROUND

Recently, as wireless communication technology that can be applied to an electronic device or the like, for example, Bluetooth is known. By using the wireless communication technology of Bluetooth, audio data can be transmitted from a mobile information terminal such as a cellular phone or a portable music player to an external device such as a headset without using an audio cable.

As a profile for audio data transmission, for example, "Advanced Audio Distribution Profile (A2DP)" (Advanced Audio/Video Distribution Profile (Bluetooth SIG)), "Generic Audio/Video Distribution Profile" (Generic Audio/Video Distribution Profile (Bluetooth SIG)), or the like are known. These are specifications for transmitting real-time audio data in a streaming manner between devices having a Bluetooth connection.

For example, in a mobile information terminal such as a cellular phone or a portable music player, audio data is coded by using a format such as SBC (Sub Band Coding), MP3 (MPEG1 Audio Layer-3), ATRAC (Advanced Transform Acoustic Coding) 3, or the like and the coded data is transmitted in units of packets. An external device such as a speaker or a headset reproduces data right after reception of the data without waiting for reception of all the packets. Accordingly, a user can listen to the sound from the mobile information terminal, the portable music player, or the like in almost real-time by using the external device such as a speaker or a headset.

In addition, as technology for preventing the replication (copy) of digital contents such as audio data, SCMS-T (Serial Copy Management System-T) has been proposed. This SCMS-T is one of methods of protecting digital contents defined in "A2DP Spec V 1.0 Sec. 11 Appendix A: Audio Streaming with Content Protection". According to the SCMS-T, in order to prevent audio data transmitted in accordance with A2DP from being directly recorded in a device or output to any other device in view of copyright protection, indication of prevention of recording or outputting the audio data is sent to a device such as a headset. For this indication, 2 bits (CP-bit and L-bit) used for a copy control process in SCMS-T are inserted into a packet format as a CP (Content Protection) header, and the 2 bits (CP-bit and L-bit) are transmitted to an external device such as a headset.

Accordingly, for an external device such as a headset that does not support SCMS-T, reproduction of transmitted audio data is not allowed, and thus the transmitted audio data is not reproduced by the external device. In other words, reproduction of the transmitted audio data is allowed only for an external device such as a headset that supports SCMS-T, and thus the transmitted audio is reproduced by the external device.

In specifications defined by "Advanced Audio Distribution Profile (A2DP)" or "Generic Audio/Video Distribution Profile", a sequence of a negotiation process for various parameters such as the type of a codec, a sampling rate, and a bit rate of audio data to be transmitted or received which is performed in advance between a device having audio data (audio source) and a device receiving the audio data and a process of starting streaming transmission is defined. In addition, according to the specifications, a streaming transmission process is allowed to be started from any side between the device (SRC) having the audio data and the device (SNK) receiving the audio data.

However, when a negotiation process is performed by the lead of the device (SNK) receiving the audio data so as to start the streaming transmission process, the device (SNK) receiving the audio data cannot know various parameters such as the type of codec, a sampling rate, a bit rate, attribute information indicating whether a content requires copyright protection, and the like of the audio data transmitted from the device (SRC) having the audio data at a time when the negotiation process is started, and generally, standard parameters are designated as various parameters for starting the streaming transmission process assuredly. In other words, a standard SBC is designated as the type of the codec for the audio data, and standard values should be designated for the bit rate and the sampling rate. Even it is designated whether a CP header for adding copy control information of audio data is included, it cannot be determined that designation of inclusion of the CP header appropriate for the content can always be made. Accordingly, there is a problem that parameters optimal to the device (SNK) receiving the audio data or the like cannot be selected and set.

SUMMARY

According to an aspect of the invention, there is provided an Information processing apparatus including: Information processing apparatus including: a dividing unit configured to divide coded audio data in unit of frame when the audio data is transmitted to an external device via wireless communication; a generating unit configured to generate packets to be transmitted to the external device based on the divided coded audio data; a transmitting unit configured to store the generated packets and transmit the stored packets to the external device; an acquiring unit configured to acquire, from the external device, parameter information supported by the external device; a determining unit configured to determine, by comparing parameter information acquired by the acquiring unit and parameter information designated by the external device to be used for transmission of the coded audio data, whether the transmission of the coded audio data is acceptable, and determine whether the parameter information designated by the external device includes protection information; and a setting unit configured to transmit a denial response to the external device if the determining unit determines that the transmission of the coded audio data is not acceptable and the parameter information includes the protection information, and perform a negotiation process from the information processing apparatus with the external device based on parameter information determined to be appropriate for the transmission of the coded audio data by the information processing apparatus.

According to another aspect of the invention, there is provided an information processing apparatus including: a dividing unit configured to divide coded audio data in unit of frame when the coded audio data is transmitted to an external device via wireless communication; a generating unit configured to generate packets to be transmitted to the external device based on the divided coded audio data; a transmitting unit configured to store the generated packets and transmit the stored packets to the external device; an acquiring unit configured to acquire, from the external device, parameter information supported by the external device; a setting unit configured to perform a negotiation process to obtain a parameter information, including protection information, to be used for transmitting the coded audio data to the external device and set the parameter information to be used for transmitting the coded audio data to the external device; and a determining unit configured to determine, by comparing parameter information acquired by the acquiring unit and parameter information designated by the external device to be used for transmission of the coded audio data, whether the transmission of the coded audio data is acceptable, and determine whether the parameter information designated by the external device includes protection information. The setting unit performs a negotiation process from the information processing apparatus with the external device based on parameter information determined to be appropriate for the transmission of the coded audio data by the information processing apparatus.

DESCRIPTION OF THE EMBODIMENTS

Hereinafter, embodiments of the present invention will be described with reference to the accompanying drawings.

Figure 1:
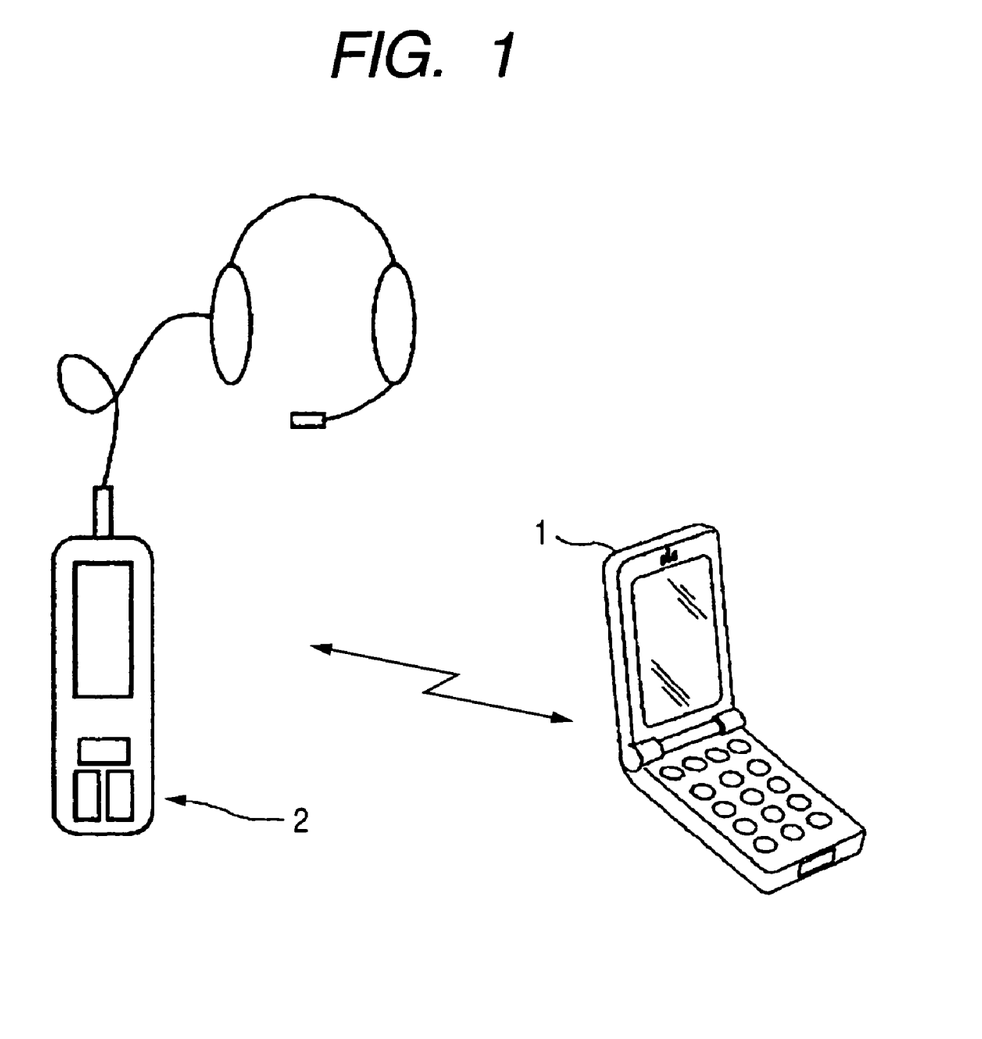
FIG. 1 is a schematic diagram showing the configuration of an information transmission/reception system according to an embodiment of the present invention.

As shown in FIG. 1, in the vicinity of a cellular phone 1, a headset 2 that can be used as an external device according to an embodiment of the present invention is disposed. The headset 2 can receive coded audio data transmitted from the cellular phone 2 via wireless communication (for example, communication according to Bluetooth protocols and wireless LAN protocols) and reproduce the audio data in real time.

Figure 2:
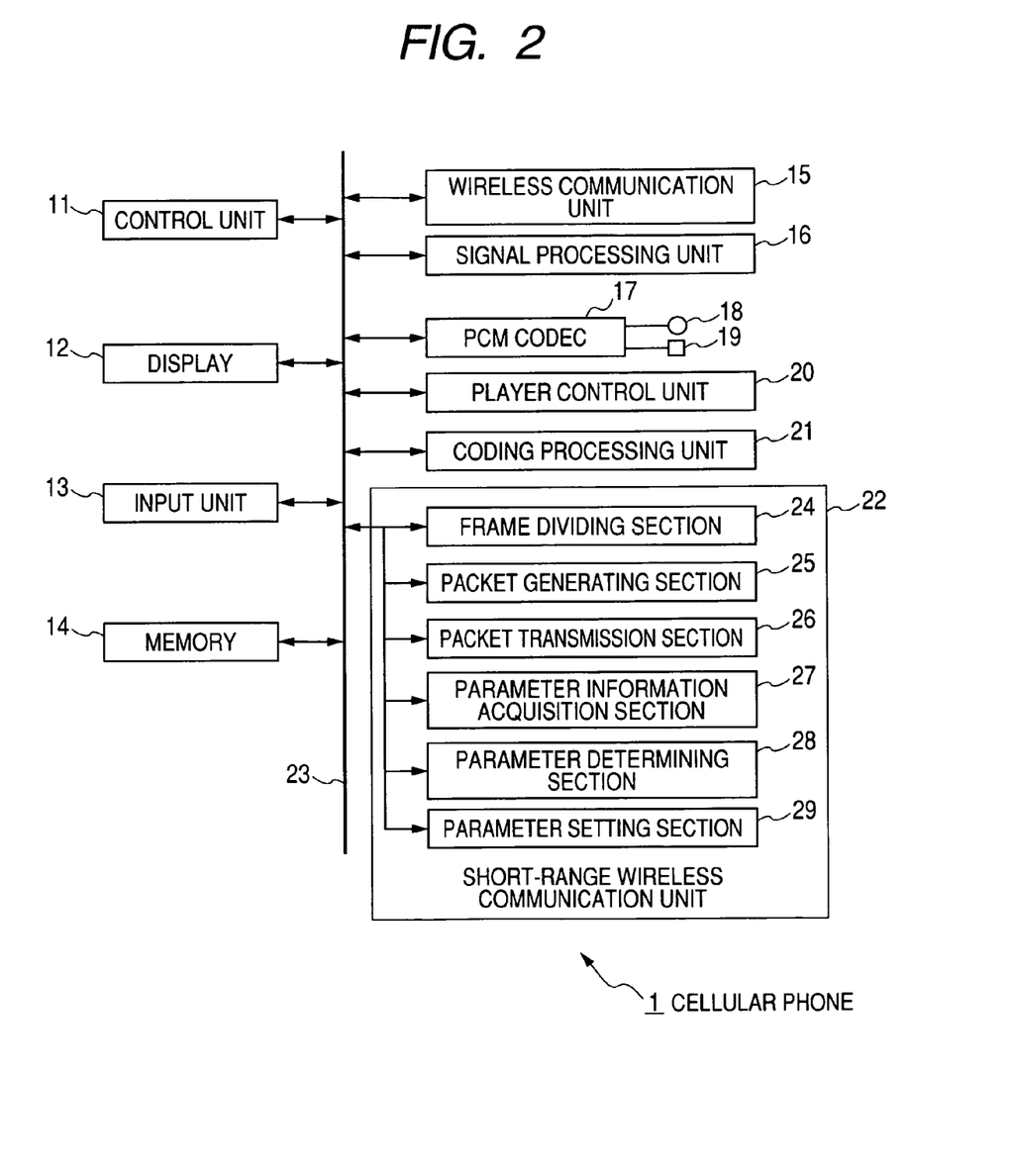
FIG. 2 is a block diagram showing the internal configuration of a cellular phone that can be used as an information processing apparatus according to an embodiment of the present invention.

FIG. 2 shows the internal configuration of the cellular phone 1 shown in FIG. 1. As shown in FIG. 2, the cellular phone has a configuration in which a control unit 11, a display 12, an input unit 13, a memory 14, a wireless communication unit 15, a signal processing unit 16, a PCM codec 17, a microphone 18, a speaker 19, a player control unit 20, a coding processing unit 21, and a short-range wireless communication unit 22 are connected to one another through a bus 23.

The control unit 11 includes a CPU (Central Processing Unit), a ROM (Read Only Memory), a RAM (Random Access Memory), and the like. The CPU controls the overall operations of the cellular phone 1 by performing various processing in accordance with a program stored in the ROM or various application programs loaded into the RAM from the memory unit 14, generating various control signals, and supplying the control signals to other units. The RAM stores data required for the CPU to perform various processing or the like.

The display 12, for example, is constituted by an LCD (Liquid Crystal Display) or the like. The input unit 13 is constituted by alpha-numeric keys for inputting numbers and alphabets, function keys for inputting instructions, or the like.

The wireless communication unit 15 receives a radio signal transmitted from a base station through an antenna, acquires an intermediate frequency signal by down-converting the received radio signal, and performs a quadrature demodulation process, despreading and synthesis processes for each path by using a rake receiver (not shown), and the like. Then, received packet data output from the rake receiver is input to the signal processing unit 16.

The signal processing unit 16, for example, is constituted by a DSP (Digital Signal Processor) and the like. First, the signal processing unit 16 divides the received packet data into data for each medium such as coded audio data and coded moving picture data and performs a decoding processing for the data divided for each medium.

For example, when the coded audio data is included in the received packet data, the signal processing unit 16 decodes the coded audio data by using a speech codec and outputs digital audio data. In addition, when the coded moving picture data is included in the received packet data, the signal processing unit 16 decodes the coded moving picture data by using a video codec and outputs digital moving picture data. In addition, when the received packet data includes a downloaded content in a compressed form, the signal processing unit 16 expands the downloaded content.

The PCM coded 17 transforms the digital audio signal into analog audio signal. The analog audio signal is amplified and output from the speaker 19. On the other hand, the digital moving picture signal is supplied to the display 12 through the bus 23.

The player control unit 20 reproduces music by executing a software program having a music reproduction function. Also, the player control unit 20 may reproduce television programs by executing a software program having a terrestrial digital one-segment radio control function.

The coding processing unit 21, for example, in a case where the music production function is executed by the player control unit 20, first, decodes the coded audio data that has been encoded in accordance with AAC (Advanced Audio Coding), aacPlus (MPEG-4 High-Efficiency AAC), MP3 (MPEG Audio Layer-3), ATRAC (Adaptive Transform Acoustic Coding), or SBC (Sub-band Coding) by using a decoding method corresponding thereto and performs a re-encoding processing by using a different encoding format if needed.

The short-range wireless communication unit 22, for example, is constituted by a module that performs wireless communication by using Bluetooth protocol and the like. The short-range wireless communication unit 22 performs wireless communication with a headset 2 located in the vicinity of the cellular phone 1. The infrared communication can be used as the wireless communication method in place of Bluetooth communication. The short-range wireless communication unit 22 includes a frame dividing section 24, a packet generating section 25, a packet transmission section 26, a parameter information acquisition section 27, a parameter determining section 28, and a parameter setting section 29.

The frame dividing section 24 reads out the coded audio data stored in the memory unit 14, divides the read-out coded audio data into frames appropriate for the codec type (for example, an encoding method such as AAC) thereof, and supplies the divided audio data in units of frames to the packet generating section 25.

The packet generating section 25 generates packets to be transmitted to the headset 2 on the basis of the coded audio data in units of frames obtained by the frame dividing section 24 and sequentially supplies the generated packets to a buffer (not shown). The buffer, for example, has a configuration for a FIFO (First In First Out) mode and sequentially buffers (temporarily stores) the packets sequentially supplied from the packet generating section 25.

The packet transmission section 26 sequentially reads out packets buffered in the buffer and sequentially transmits the read-out packets of a predetermined amount at predetermined timings to the headset 2 via wireless communication.

The parameter information acquisition section 27 acquires parameter information that is information on parameters including a codec type, a sampling rate, a bit rate, and a content protection method such as an SCMS-T method or a DTCP (Digital Transmission Content Protection) method supported by the headset 2 from the headset 2 via wireless communication.

The parameter determining section 28 checks a parameter regarding content protection method acquired in a negotiation process with the headset 2 and determines whether the coded audio data is allowed to be transmitted to the headset 2 based on the check.

If it is determined that the parameter regarding the content protection method acquired in the negotiation process is not appropriate for the coded audio data to be transmitted to the headset 2, the parameter setting section 29 transmits a denial response to the headset 2, performs a negotiation process with the headset 2 by specifying a parameter appropriate for the coded audio data to be transmitted from the cellular phone 1 to the headset 2, and initializes the parameter regarding transmission of the coded audio data to the headset 2.

Figure 3:
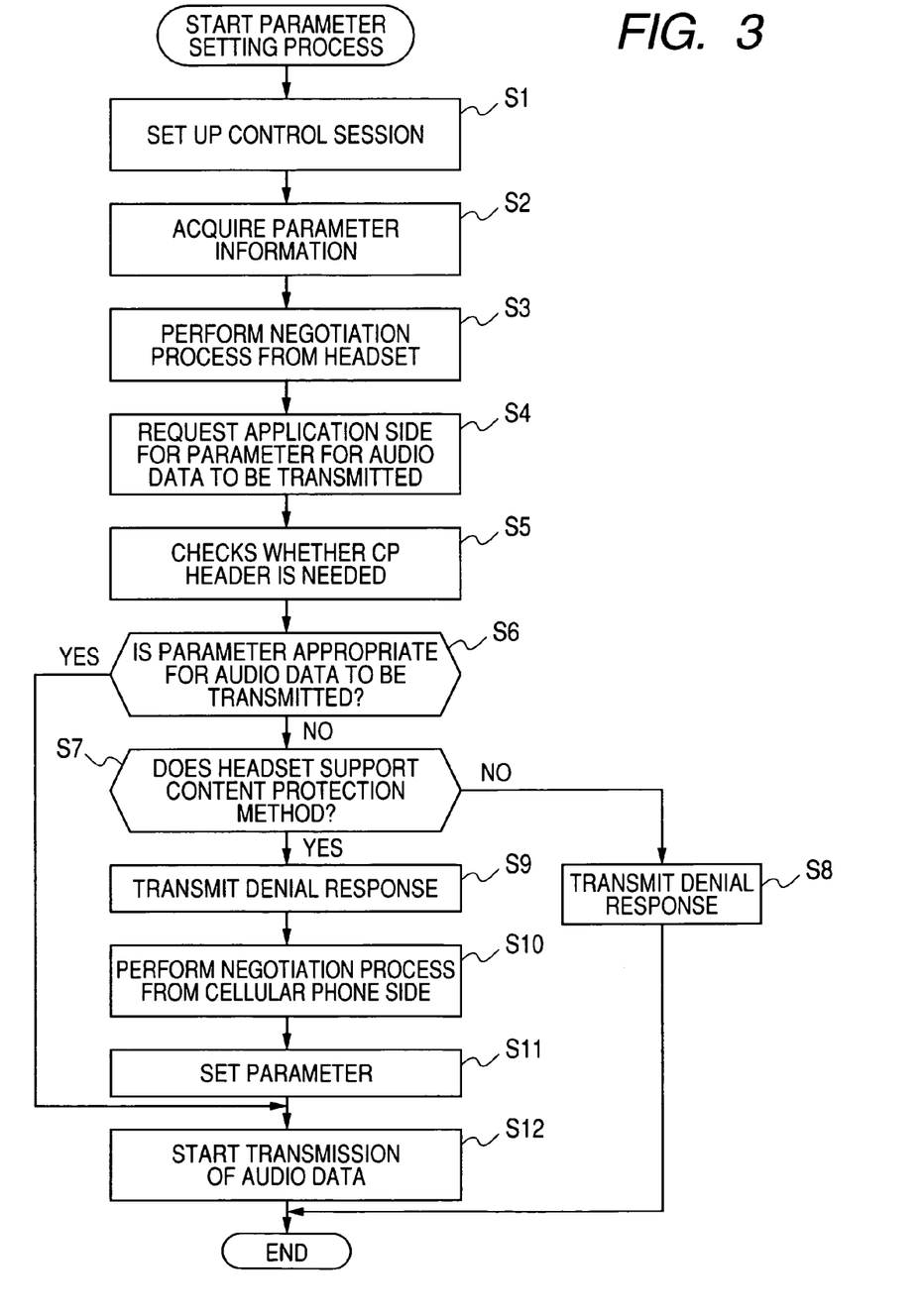
FIG. 3 is a flowchart of a parameter setting process of the cellular phone shown in FIG. 2.
Figure 4:
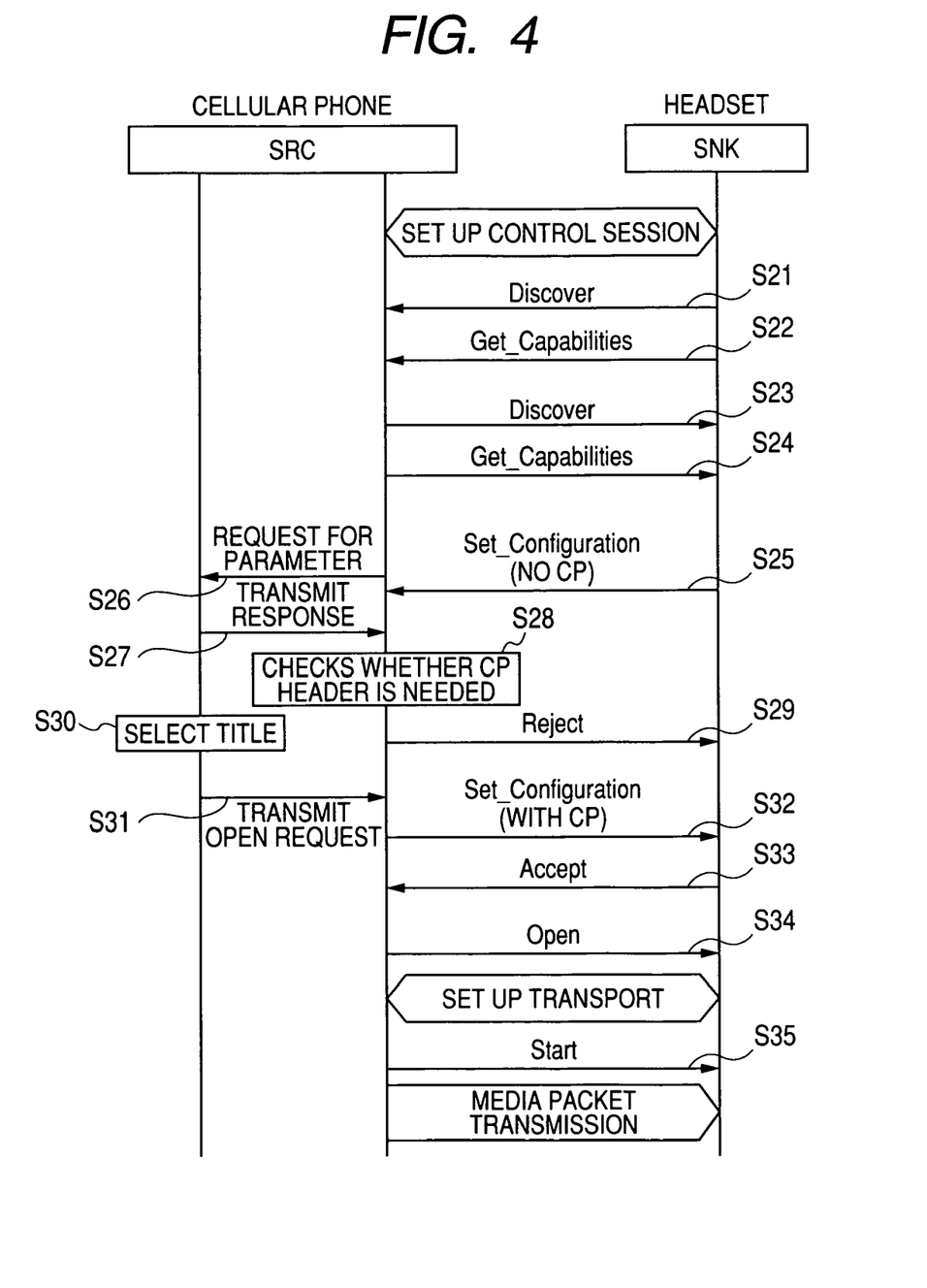
FIG. 4 is a flowchart showing a detailed process sequence between the cellular phone and a headset for the parameter setting process described with reference to the flowchart shown in FIG. 3.

Next, a parameter setting process performed by the cellular phone 1 shown in FIG. 2 will be described with reference to a flowchart shown in FIG. 3. The parameter setting process is performed when the handset 2, that is an external device KNK, initiates a negotiation process for performing transmission of streaming data such as the coded audio data from the cellular phone 1. FIG. 4 shows a detailed process between the cellular phone 1 and the headset 2 for the parameter setting process described with reference to the flowchart shown in FIG. 3.

In Step S1, the cellular phone 1 establishes a signaling session for transmitting signal data between the headset 2 and the cellular phone 1 by using the short-range wireless communication unit 22. Here, above description shows that the cellular phone 1 initiate establishment of the signaling session, however, the headset 2 also can initiate to establish the signaling session.

After the signaling session is established, as shown in Steps S21 to S22 shown in FIG. 4, the headset 2 requests for parameter information that is information on parameters including a codec type, a sampling rate, a bit rate, and a content protection method such as an SCMS-T method or a DTCP method supported by the cellular phone 1 and acquires the parameter information supported by the cellular phone 1.

For example, when the cellular phone 1 supports AAC, aacPlus, and SBC as codec types, the parameter information indicating these codec types notified to the headset 2. In addition, when the cellular phone 1 supports a content protection method such as an SCMS-T method or a DTCP method, the headset 2 also informed of the parameter information specifying the supported content protection method from the cellular phone 1.

In Step S2, the parameter information acquisition section 27 of the short-range wireless communication unit 22 acquires the parameter information including codec types, a sampling rate, a bit rate, and a content protection method such as an SCMS-T method or a DTCP method supported by the headset 2, from the headset 2 via the signaling session and supplies the acquired parameter information to the parameter determining section 28.

For example, as shown in Steps S23 to S24 shown in FIG. 4, the parameter information specifying the codec types, the sampling rate, the bit rate, and the like supported by the headset 2 is acquired by the cellular phone 1. In particular, when the headset 2 supports AAC and SBC as the codec types, the parameter information specifying the codec types is acquired by the cellular phone 1. In addition, when the headset 2 supports a content protection method such as an SCMS-T method or a DTCP method, the parameter information specifying the content protection method is acquired by the cellular phone 1.

In Step S3, the parameter setting section 29 performs a negotiation process with the handset 2 responding to a request from the headset 2. In the negotiation process, the parameter information regarding coded audio data to be transmitted to the headset 2 is determined (Step S25 shown in FIG. 4).

At this moment, the parameter setting section 29 extracts parameter information, which is designated in the negotiation process from the headset 2, and supplies the extracted parameter information to the parameter determining section 28. When the headset 2 negotiates with the cellular phone 1, various parameters such as the codec type, sampling rate, bit rate, and the like regarding the coded audio data to be transmitted from the cellular phone 1 cannot be known, and accordingly, a standard parameter such as the SBC or the like as the codec type of the audio data is designated. In addition, at this moment, "No CP Header" is assumed to be designated as the parameter of content protection.

In Step S4, the parameter determining section 28 requests the player control unit 20 to transmit parameter information regarding the coded audio data (Step S26 shown in FIG. 4). The parameter information regarding the coded audio data is needed to decode and reproduce the coded audio data.

In other words, parameter information such as the codec type and information on presence or absence of the CP header consisting of 2 bits data (CP-bit and L-bit) used for a copy control, for example copy protection, are stored is inserted, or the like is requested to the player control unit 20 which executes the software program according to the music reproduction function.

In Step S5, the parameter determining section 28 receives a response from the player control unit 20 and checks whether a CP header of the coded audio data to be transmitted is needed on the basis of the received response (Steps S27 to S28 shown in FIG. 4). Namely, the parameter determining section 28, based on the received response, checks whether the CP header is to be inserted into the header of the packets containing coded audio data to be transmitted. In particular, the parameter determining section 28 determines that the CP header is to be inserted when insertion of the CP header is needed. On the other hand, the parameter determining section 28 determines that the CP header is not to be inserted when the insertion of the CP header is not needed.

In Step S6, the parameter determining section 28, based on the designated parameter information from the headset 2 and information on whether the insertion of the CP head is needed, determines whether the parameter information designated in the negotiation process from the headset 2 is appropriate for the coded audio data to be transmitted to the headset 2.

In particular, it is determined that the coded audio data to be transmitted to the headset 2 is not appropriate in view of content protection, when the parameter information regarding content protection designated in a negotiation process from the headset 2 indicates "No CP Header" whereas it is determined that the CP header corresponding to the coded audio data to be transmitted to the headset 2 is needed on the basis of the acquired parameter information from the player control unit 20.

On the other hand, it is determined that the coded audio data to be transmitted to the headset 2 is appropriate in view of content protection, when the parameter information regarding content protection designated in a negotiation process from the headset 2 indicates "No CP Header" and it is determined that the CP header corresponding to the coded audio data to be transmitted to the headset 2 is not needed on the basis of the acquired parameter information from the player control unit 20.

Namely, it is determined whether the CP header of the coded audio data to be transmitted is needed and the parameter information indicating presence or absence of the CP header regarding content protection designated in the negotiation process from the headset 2 are identical to each other. Then, on the result of the determination, it is determined whether the parameter information is appropriate for the coded audio data to be transmitted to the headset 2.

When it is determined that the parameter information regarding content protection designated in the negotiation process from the headset 2 is not appropriate for the coded audio data to be transmitted to the headset 2 in Step S6, the parameter determination section 28 determines whether the headset 2 supports a content protection method such as the SCMS-T method, the DTCP method, or the like by using the acquired parameter information including parameters supported by the headset 2, in Step S7.

When it is determined that the headset 2 serving as the external device does not support the content protection method, for example the SCMS-T method, the DTCP method, or the like, in Step S7, the parameter setting section 29 transmits a denial response on the basis of the result of determination of the parameter determination section 28 via wireless communication in Step S8, considering that reproduction of the coded audio data in the headset 2 cannot be made even if the CP header is inserted into a header of packets containing the coded audio data. Thereafter, the parameter setting process is completed.

On the other hand, when it is determined that the headset 2 serving as the external device supports the content protection method such as the SCMS-T method, the DTCP method, or the like in Step S7, the parameter setting section 29 transmits a denial response to the headset 2 on the basis of the result of determination made by the parameter determining section 28 in Step S9 (Step S29 shown in FIG. 4).

In Step S10, the player control unit 20 executes the software program according to the music player function, selects a title in accordance with an operation of a user, and transmits an open request to the headset 2 via wireless communication, and the parameter setting section 29 initiates a negotiation process for the headset 2 by using a parameter information to be determined appropriate for the coded audio data to be transmitted to the headset 2. Namely, by using "With CP Header" as parameter information of the content protection from among a plurality of parameter information appropriate for the coded audio data to be transmitted to the headset 2, a negotiation process is performed for the headset 2. In Step S11, the parameter setting section 29 initially sets the parameter information of transmission of coded audio data to the headset 2 (Steps S30 to S33 shown in FIG. 4).

In particular, the parameter information used for transmission of the coded audio data to the headset 2 is initially set by using "With CP Header" as the parameter information of content protection appropriate for the coded audio data to be transmitted to the headset 2, when the parameter information of content protection designated in the negotiation process from the headset 2 for the parameter information of transmission of the audio data to the headset 2 is "No CP Header" in a case where it is checked that the CP header of the coded audio data to be transmitted to the headset 2 is needed on the basis of the acquired parameter information including a plurality of parameter information supported by the headset 2 and the result of checking whether the CP header is needed.

In addition, although the parameter information of content protection of the coded audio data has been explicitly described as above, in the process of Step S11, parameters for transmission of audio data to the headset 2 such as the codec type, sampling rate, bit rate, and the like of the audio data are initially set simultaneously.

Thereafter, a transport session for transmitting media data such as coded audio data is established for packet (media packet) transmission between the cellular phone 1 and the headset 2 (Step S34 shown in FIG. 4).

After the transport session is established, in Step S12, the fame dividing section 24 divides the audio coded data into frames appropriate for the codec type determined in the negotiation process. The packet generating section 25 generates a plurality of packets each including a header and the framed divided at the frame dividing section 24 to be transmitted to the headset 2 and store the generated packets into buffer (not shown). The packet transmission section 26 sequentially read out the packets from the buffer, and sequentially transmit the read-out packets of a predetermined amount at predetermined timings to the headset 2 via wireless communication (Step S35 shown in FIG. 4).

On the other hand, when it is determined that the parameter of the content protection designated in the negotiation process from the headset 2 is appropriate for the coded audio data to be transmitted to the headset 2 in Step S6, the parameter setting section 29 receives parameter information including the parameter information of content protection designated in the negotiation process from the headset 2 on the basis of the result of determination made by the parameter determining section 28 and sets the parameter information of transmission of the coded audio data to the headset 2 by using the received parameter information. Then, the process proceeds to Step S12, and a plurality of packets are generated and transmitted to the headset 2 in Step S12.

According to an embodiment of the present invention, parameter information including the codec types, sampling rates, bit rates, content protection methods such as an SCMS-T method or a DTCP method supported by the headset 2 is acquired from the headset 2 via wireless communication. In addition, it is checked, by the parameter determining section 28, whether the CP header of the audio data to be transmitted is needed on the basis of the response from the play control unit 20. Thereafter it is determined whether the parameter information regarding the content protection designated in the negotiation process from the headset 2 is appropriate for the coded audio data to be transmitted to the headset 2 by using the acquired parameter information and the result of checking whether the CP header is needed.

When it is determined that the parameter information regarding content protection designated in the negotiation process from the headset 2 is not appropriate for the coded audio data to be transmitted to the headset 2, it is determined whether the head set 2 supports the content protection method by using the parameter information including parameters supported by the headset 2. When it is determined that the headset 2 supports the content protection method, a denial response is transmitted to the headset 2, a negotiation process from the cellular phone 1 for the headset 2 is performed by using a parameter information appropriate for the coded audio data to be transmitted to the headset 2, and the parameter information regarding transmission of the coded audio data to the headset 2 can be initially set. On the other hand, when it is determined that the headset 2 does not support the content protection method, a denial response is transmitted to the headset 2.

Accordingly, a parameter information appropriate for the content (audio data) to be transmitted can bet set. In other words, when a copy control process for the content (audio data) to be transmitted is performed by using a predetermined content protection method, parameter information appropriate for the content protection method can be set. Accordingly, a situation that a content (audio data) transmitted from the headset 2 cannot be reproduced due to a copy control process performed for the content (audio data) to be transmitted by using a predetermined content protection method in a case where a negotiation process is performed by the lead of the headset 2 can be prevented. As a result, the sound quality of the content (audio data) for reproduction in the headset 2 can be improved. In addition, since the user's effort for performing a negotiation process from the cellular phone 1 again can be relieved, the usability for reproduction of the content (audio data) in the headset 2 can be improved.

In addition, although a case where a music reproduction function executed by the media player control unit 20 has been explicitly described in the embodiment of the present invention, however, the present invention can be applied to a case where any media player function such as a terrestrial digital one-segment radio control function is executed.

In addition, in the parameter setting process described above with reference to FIGS. 3 and 4, parameter information regarding coded audio data is requested for the music reproduction function executed by the player control unit 20 in a negotiation process from the headset 2 for checking whether the CP header is needed, and it is determined whether the parameter information regarding the content protection designated in the negotiation process from the headset 2 is appropriate for the coded audio data to be transmitted to the headset 2. However, the present invention is not limited thereto, and it may be configured that the parameter information including the parameter of content protection designated in the negotiation process from the headset 2 is used once so as to establish a transport session, and the parameter information regarding the content protection set in the negotiation process from the headset 2 is determined whether to be appropriate for the coded audio data to be transmitted to the headset 2. Then, when the parameter set in the negotiation process from the headset 2 is determined not to be appropriate for the coded audio data to be transmitted to the headset 2, it may be configured that a negotiation process from the cellular phone 1 for the headset 2 is performed again by using a parameter information appropriate for the coded audio data to be transmitted to the headset 2 and the parameter information regarding transmission of the coded audio data to the headset 2 is set again.

Hereinafter, a parameter setting process using this method will be described.

Figure 5:
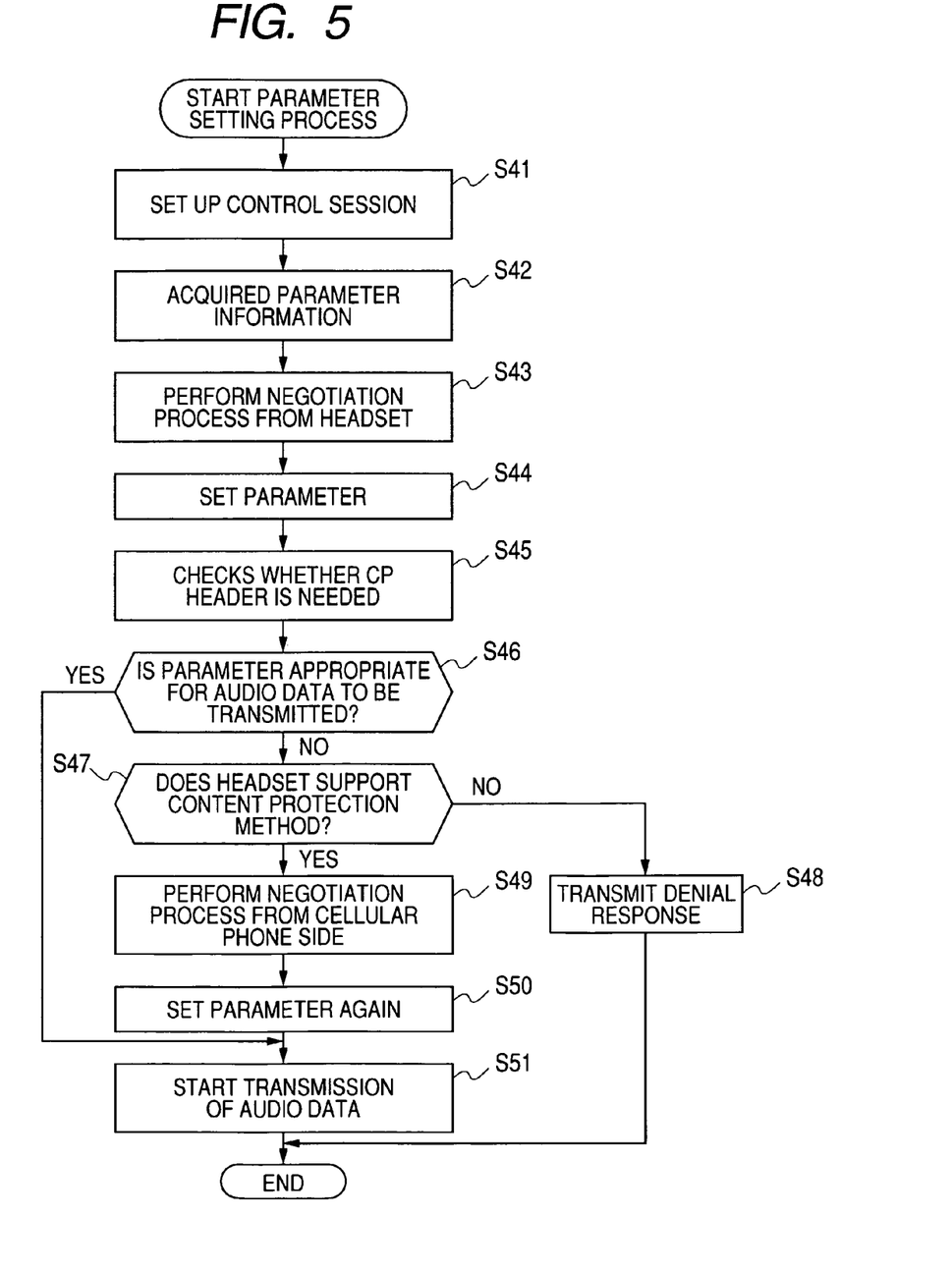
FIG. 5 is a flowchart of another parameter setting process of the cellular phone shown in FIG. 2.
Figure 6:
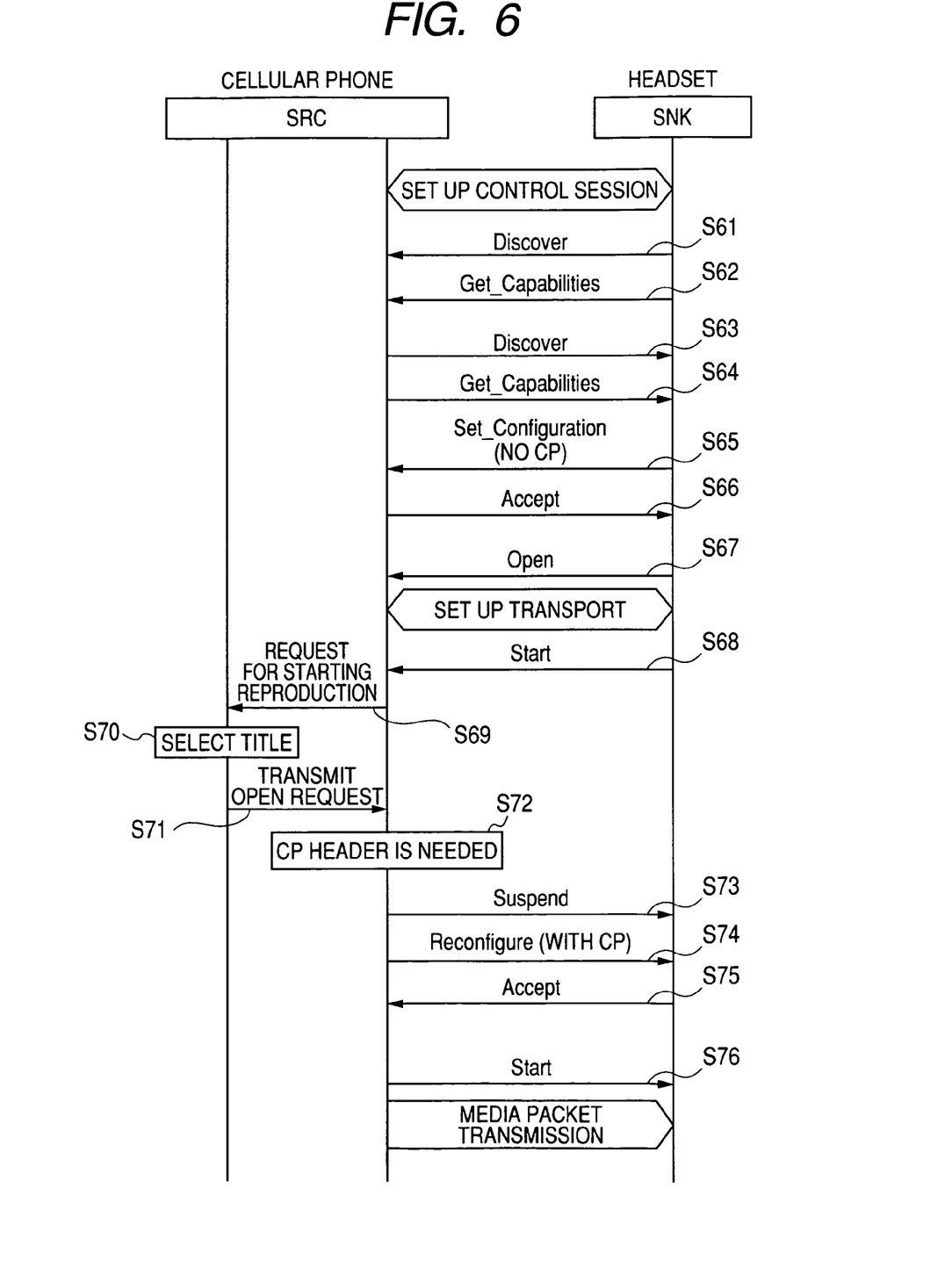
FIG. 6 is a detailed process sequence between the cellular phone and the headset in the parameter setting process described with reference to the flowchart shown in FIG. 5.

Another parameter information setting process performed in the cellular phone 1 shown in FIG. 2 will be described with reference to a flowchart shown in FIG. 5. FIG. 6 is a detailed process between the cellular phone 1 and the headset 2 in the parameter setting process described with reference to the flowchart shown in FIG. 5. The processes of Steps S41 to S42, S47, S48, and S51 shown in FIG. 5 are basically the same as those of Steps S1 to S2, S7, S8, and S9 shown in FIG. 3, and descriptions thereof to be repeated are omitted and other corresponding processes will be appropriately omitted.

In Step S43, the parameter setting section 29 performs a negotiation process with the headset 2 for a parameter information regarding transmission of coded audio data to the headset 2 in accordance with the negotiation process from the headset 2 via wireless communication (Steps S65 to S66 shown in FIG. 6). At this moment, the parameter information including "No CP Header", shown in FIG. 7, as parameter information regarding content protection designated in the negotiation process from the headset 2 is accepted once.

In Step S44, the parameter setting section 29 acquires the parameter information including a parameter of content protection, which is used for transmitting the coded audio data to the headset 2, designated in the negotiation process from the headset 2 and initializes the parameter information regarding transmission of the coded audio data to the headset 2 by using the acquired parameter information (Steps S65 to S66 shown in FIG. 6). The parameter information regarding transmission of the coded audio data to the headset 2 is initially set by using "No CP Header" as parameter information of content protection of the coded audio data to be transmitted to the headset 2. When the headset 2 negotiates with the cellular phone 1, various parameters such as the coded type, sampling rate, bit rate, and the like of the coded audio data transmitted from the cellular phone 1 cannot be known to the headset 2, and accordingly, a standard parameter such as SBC or the like as the coded type of the coded audio data is designated.

Thereafter, an open request from the headset 2 is made via wireless communication and a transport session for transmitting packets (media packets) between the cellular phone 1 and the headset 2 is established (Step S67 shown in FIG. 6). Then, a request for starting packet (media packet) transmission to the cellular phone 1 from the headset 2 side is made, and a request for starting reproduction from the short-range wireless communication unit 22 is made for player control unit 20. After a title is selected, an open request is made from the player control unit 20 to the short-range wireless communication unit 22 (Steps S68 to S71 shown in FIG. 6).

In Step S45, the parameter determining section 28 checks whether the CP header of the coded audio data to be transmitted is needed in accordance with the open request from the player control unit 20 (Step S72 shown in FIG. 6). In other words, it is acquired whether the CP header is inserted for the parameter of the coded audio data to be transmitted, and whether the CP header of the coded audio data to be transmitted is needed is checked. In particular, when it is acquired that the CP header is inserted, it is checked that the CP header of the coded audio data to be transmitted is needed. On the other hand, when it is acquired that the CP header is not inserted, it is checked that the CP header of the coded audio data to be transmitted is not needed.

In Step S46, the parameter determining section 28 determines whether the parameter information of content protection set by the parameter setting section 29 in the negotiation process from the headset 2 used for transmission of the coded audio data to the headset 2 is appropriate for the coded audio data to be transmitted to the headset 2. A detailed determination method is the same as that in Step S6 shown in FIG. 3, and thus a description thereof to be repeated is omitted here.

In Step S46, when it is determined that the parameter information of content protection set by the parameter setting section 29 in the negotiation process from the headset 2 is not appropriate for the coded audio data to be transmitted to the headset 2, the process proceeds to Step S47. Next in Step S47, it is determined whether the headset 2 supports the content protection method. When it is determined that the headset 2 supports the content protection method, the parameter setting section 29, in Step S49, transmits a hold request for the headset 2 and performs a negotiation process from the cellular phone 1 for the headset 2 by using a parameter information appropriate for the coded audio data to be transmitted to the headset 2 again. In other words, a negotiation process for the headset 2 is performed by using "With CP Header" as the parameter information of content protection from among parameters appropriate for the coded audio data to be transmitted to the headset 2. In Step S50, the parameter setting section 29 sets the parameter information including the parameter of content protection used for transmission of the coded audio data to the headset 2 again (Steps S73 to S75 shown in FIG. 6).

Accordingly, the parameter information used for transmission of the coded audio data to the headset 2 is set again by using "With CP Header" as the parameter information of content protection appropriate for the coded audio data to be transmitted to the headset 2.

Thereafter, the process proceeds to Step S51, and a transmission process of coded audio data using the parameter set again is started (Step S76 shown in FIG. 6).

According to an embodiment of the present invention, the parameter information designated in the negotiation process from the headset 2 is accepted once so as to establish a transport session, and the parameter information of content protection set by the parameter setting section 29 in the negotiation process from the headset 2 can be determined whether to be appropriate for the coded audio data to be transmitted to the headset 2. Then, when the parameter information of content protection set by the parameter setting section 29 in the negotiation process from the headset 2 is determined not to be appropriate for the coded audio data to be transmitted to the headset 2, a negotiation process from the cellular phone 1 for the headset 2 is performed again by using a parameter information appropriate for the coded audio data to be transmitted to the headset 2 and the parameter information used for transmission of the coded audio data to the headset 2 can be set again. Accordingly, a parameter information appropriate for the content (audio data) to be transmitted can be set. In other words, when a copy control process for the content (audio data) to be transmitted is performed by using a predetermined content protection method, parameter information appropriate for the content protection method can be set. Accordingly, a situation that a content (audio data) transmitted from the headset 2 cannot be reproduced due to a copy control process performed for the content (audio data) to be transmitted by using a predetermined content protection method in a case where a negotiation process is performed by the lead of the headset 2 can be prevented. As a result, the sound quality of the content (audio data) for reproduction in the headset 2 can be improved. In addition, since the user's effort for performing a negotiation process from the cellular phone 1 again can be relieved, the usability for reproduction of content (audio data) in the headset 2 can be improved.

In addition, the present invention may be applied to a PDA (Personal Digital Assistant), a personal computer, a portable gaming device, a portable motion picture reproducing device, or any other information processing apparatus, along with the cellular phone 1.

The series of processes described in the embodiment of the present invention may be implemented by software or hardware.

According to the above-described embodiments, a parameter appropriate for a content to be transmitted can be set.

What is claimed is:

1. Information processing apparatus comprising:
a dividing unit configured to divide coded audio data in unit of frame when the audio data is transmitted to an external device via wireless communication;
a generating unit configured to generate packets to be transmitted to the external device based on the divided coded audio data;
a transmitting unit configured to store the generated packets and transmit the stored packets to the external device;
an acquiring unit configured to acquire, from the external device, parameter information supported by the external device;
a determining unit configured to determine, by comparing parameter information acquired by the acquiring unit and parameter information designated by the external device to be used for transmission of the coded audio data, whether the transmission of the coded audio data is acceptable, determine whether the parameter information designated by the external device includes protection information, and determine whether the parameter information designated by the external device matches the protection information for the audio data to be transmitted to the external device; and
a setting unit configured to transmit a denial response to the external device if the determining unit determines that the transmission of the coded audio data is not acceptable and the parameter information includes the protection information, and wherein if the determining unit determines that there is no match between the parameter information and the protection information, the setting unit performs a negotiation process from the information processing apparatus with the external device based on parameter information determined to be appropriate for the transmission of the coded audio data by the information processing apparatus.

2. The information processing apparatus according to claim 1, wherein the setting unit does not perform the negotiation process if the parameter information does not include the protection information.

3. The information processing apparatus according to claim 1, wherein the setting unit does not perform the negotiation process if the external device does not support a predetermined copy protection method for the coded audio data.

4. The information processing apparatus according to claim 1, wherein the protection information regulates copy of the coded audio data.

5. Information processing apparatus comprising:
a dividing unit configured to divide coded audio data in unit of frame when the coded audio data is transmitted to an external device via wireless communication;

a generating unit configured to generate packets to be transmitted to the external device based on the divided coded audio data;

a transmitting unit configured to store the generated packets and transmit the stored packets to the external device;

an acquiring unit configured to acquire, from the external device, parameter information supported by the external device;

a setting unit configured to perform a negotiation process to obtain a parameter information, including protection information, to be used for transmitting the coded audio data to the external device and set the parameter information to be used for transmitting the coded audio data to the external device; and a determining unit configured to determine, by comparing parameter information acquired by the acquiring unit and parameter information designated by the external device to be used for transmission of the coded audio data, whether the transmission of the coded audio data is acceptable, determine whether the parameter information designated by the external device includes protection information, and determine whether the parameter information designated by the external device matches the protection information for the audio data to be transmitted to the external device, wherein if the determining unit determines that there is no match between the parameter information and the protection information, the setting unit performs a negotiation process from the information processing apparatus with the external device based on parameter information determined to be appropriate for the transmission of the coded audio data by the information processing apparatus.

6. The information processing apparatus according to claim 5, wherein the setting unit does not perform the negotiation process if the parameter information does not include the protection information.

7. The information processing apparatus according to claim 5, wherein the setting unit does not perform the negotiation process if the external device does not support a predetermined copy protection method for the coded audio data.

8. The information processing apparatus according to claim 5, wherein the protection information regulates copy of the coded audio data.

9. Information processing apparatus comprising: a dividing unit configured to divide content data in unit of frame when the content data is transmitted to an external device via wireless communication;

a generating unit configured to generate packets to be transmitted to the external device based on the divided content data;

a transmitting unit configured to store the generated packets and transmit the stored packets to the external device;

an acquiring unit configured to acquire, from the external device, parameter information supported by the external device;

a determining unit configured to determine, by comparing parameter information acquired by the acquiring unit and parameter information designated by the external device to be used for transmission of the content data, whether the transmission of the content data is acceptable, determine whether the parameter information designated by the external device includes protection information, and determine whether the parameter information designated by the external device matches the protection information for the audio data to be transmitted to the external device, wherein if the determining unit determines that there is no match between the parameter information and the protection information, the setting unit performs a negotiation process from the information processing apparatus with the external device based on parameter information determined to be appropriate for the transmission of the coded audio data by the information processing apparatus.

10. The information processing apparatus according to claim 9, wherein the setting unit does not perform the negotiation process if the parameter information does not include the protection information.

11. The information processing apparatus according to claim 9, wherein the setting unit does not perform the negotiation process if the external device does not support a predetermined copy protection method for the coded audio data.

12. The information processing apparatus according to claim 9, wherein the protection information regulates copy of the coded audio data.

* * * * *